SWEEP FAILURE PROTECTIVE SYSTEM
Filed Dec. 10, 1962
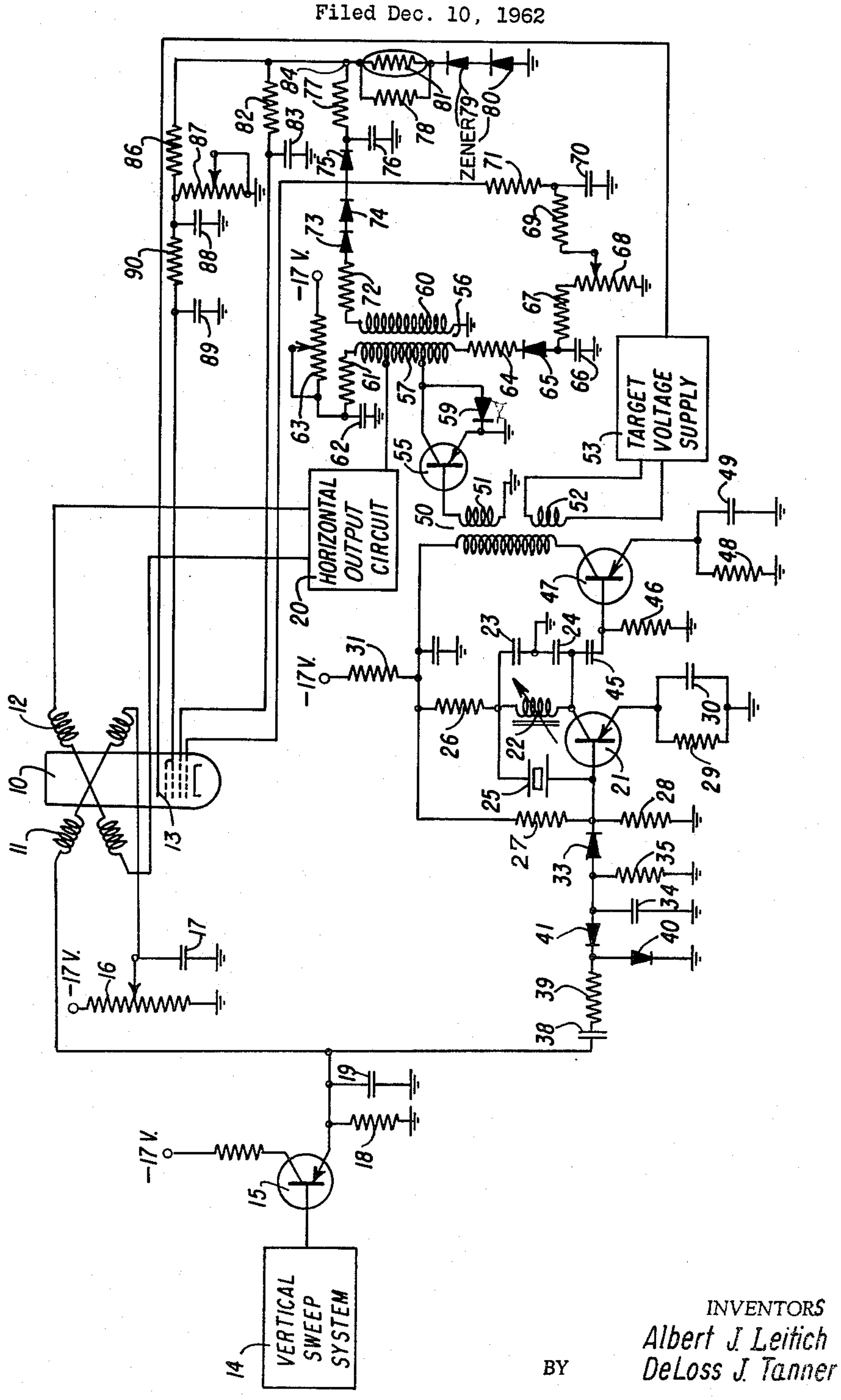
INVENTORS
Albert J. Leitich
DeLoss J. Tanner
BY
Mueller & Aichele Attys.

United States Patent Office 3,185,886

Patented May 25, 1965

3,185,886

SWEEP FAILURE PROTECTIVE SYSTEM

Albert J. Leitich, Chicago, and De Loss J. Tanner, Bensenville, Ill., assignors to Motorola, Inc., Chicago, Ill., a corporation of Illinois Filed Dec. 10, 1962, Ser. No. 243,327
10 Claims. (Cl. 315—20)

This invention relates generally to protection circuits, and more particularly to a protection circuit for a cathode ray tube whereby the high voltage is removed from the tube upon failure of either the vertical or horizontal sweep systems for the tube.

In systems using a cathode ray tube, either to pickup a signal or to reproduce a signal, it is essential that the electron beam be cut off when either of the sweep systems fails and this may be accomplished by removing the high voltage. This is because the electron beam will damage the screen or target of the tube if it continues to strike at a fixed position. In normal operation of a cathode ray tube the beam is swept across the target or screen, as by horizontal and vertical sweep or deflection systems, to provide a rectangular raster or pattern. If either sweep system fails, the beam will produce a line and this concentration of the beam may damage the target or screen. If both sweep systems fail, the beam will strike a single point to provide a great concentration of energy which may damage the screen or target in a very short time.

Systems have been used for cutting off the high voltage or otherwise stopping the electron beam in the event of failure of the horizontal or vertical sweep systems. Some systems leave the high voltage on but cut off the beam by biasing off the control grid or cathode. Other systems respond to changes in output of the sweep systems and do not provide definite on-off operation. These systems result in substantial additional cost as they require added components such as relays, tubes, or transistors to sense the failure of the horizontal and vertical sweep systems, and to cut off the beam.

It is an object of the present invention to provide a high voltage system for a cathode ray tube system, wherein the high voltage is cut off if either or both of the sweep systems for the tube fails.

A further object of the invention is to provide a high voltage system for a cathode ray tube which is coupled to the horizontal and vertical sweep systems and wherein the high voltage is disabled by failure of either the horizontal or the vertical sweep systems.

A feature of the invention is the provision of a high voltage system for a cathode ray tube which is derived from the horizontal deflection system for the tube, and wherein the oscillator for the horizontal deflection system includes a circuit for disabling the same which is rendered operative only when a wave from the vertical deflections system is applied thereto.

Another feature of the invention is the provision of a cathode ray tube system including a horizontal deflection oscillator having a transistor and a diode for grounding the base of the transistor to prevent feedback for producing oscillations, with a rectifier circuit coupled to the vertical deflection systems providing a bias potential for the diode to cut off the same to remove the ground, so that the horizontal oscillator is operative. The wave derived from the horizontal oscillator is applied to the horizontal sweep output stage, to which high voltage rectifier systems are coupled for providing operating voltages for the cathode ray tube.

The invention is illustrated in the accompanying drawing where the single figure illustrates the cathode ray tube protecting circuit of the invention.

The invention is described for use in a television camera system including a cathode ray tube such as a vidicon pickup tube. Vertical and horizontal sweep systems are provided for deflecting the electron beam of the tube to provide a raster at the target. The high voltages for the pickup tube are developed from the horizontal sweep system by rectifier systems. This includes voltages required for the accelerating and focus electrodes of the tube, and also the target voltage. The horizontal sweep system includes a crystal controlled oscillator for providing the desired horizontal sweep frequency. Oscillations are applied from the oscillator through a buffer stage to a transformer which is coupled to the horizontal sweep output system to which the high voltage rectifier system is coupled. The oscillator includes a resonant tank circuit and a crystal coupled between the collector and base electrodes providing feedback for sustaining oscillations. A diode and capacitor are series connected between the base electrode of the transistor and ground, and the diode is rendered conducting by the bias on the base electrode to prevent feedback to the base electrode and thereby prevent oscillations. A bias circuit coupled to the vertical sweep system produces a bias voltage which is applied to the diode, and this overcomes the bias on the base electrode to hold the diode cut off when the vertical sweep system operates. Accordingly, the horizontal oscillator will operate only when the vertical sweep system is operative, and the high voltage will be produced only when the horizontal sweep system operates. Therefore, failure of either the horizontal or vertical sweep systems will disable the high voltage.

Although the circuit is described in connection with a television camera system, it is obvious that the protection circuit may be used in any cathode ray tube system where it is desired that the high voltage be cut off upon failure of either of the sweep or deflection circuits.

Considering now the drawing, the cathode ray tube 10 is illustrated as a vidicon pickup tube, but the system may be used with cathode ray tubes of various types. Vertical deflection coils 11 and horizontal deflection coils 12 are provided adjacent to the tube to deflect the beam thereof. Current for the vertical deflection coils 11 is provided by a vertical sweep system 14 and output transistor 15. The emitter electrode of transistor 15 is connected to ground by resistor 18 and capacitor 19 and to coils 11. The circuit through the coils is completed through potentiometer 16 which is connected to the D.C. supply to provide a centering potential. The vertical sweep signal is bypassed by capacitor 17.

Current is applied to the horizontal deflection coils 12 by the horizontal output circuit 20. The horizontal frequency is developed by the oscillator including transistor 21 and the tank circuit including coils 22 and capacitors 23 and 24. Crystal 25 provides feedback to the base electrode of transistor 21 at the desired frequency of oscillation. Bias potential is applied to the collector electrode of transistor 21 through load resistor 26, and to the base electrode thereof by the voltage divider including resistors 27 and 28. The emitter electrode of transistor 21 is returned to ground by resistor 29 bypassed by capacitor 30. Operating potential is applied to the oscillator through resistor 31, and the oscillator maintains oscillations at the frequency determined by crystal 25.

A diode 33 is connected in series with capacitor 34 and resistor 35 between the base electrode of transistor 21 and ground to provide protective action as will be described. The diode 33 is poled so that the negative potential provided by resistors 27 and 28 holds the diode conductive. Diode 33 and capacitor 34 therefore establish a circuit from the base electrode of transistor 21 to ground, to prevent feedback to the base electrode for sustaining oscillations.

In order to render the horizontal oscillator operative, a bias is applied to the diode 33 to cut it off to thereby unground the base electrode. This bias is provided from the vertical sweep system, and is developed from the signal across resistor 18 and capacitor 19 of the vertical output stage. This signal is applied through capacitor 38 and resistor 39 to the voltage doubler formed by diodes 40 and 41. The voltage doubler develops a voltage across capacitor 34 which is more negative than the voltage applied to diode 33 by the resistors 27 and 28. This cuts off diode 33 to remove the ground from the base electrode of transistor 21, so that the horizontal oscillator operates to develop the horizontal sweep frequency.

The output of the horizontal oscillator is coupled through capacitor 45 and across resistor 46 to the base electrode of transistor 47 which serves as a buffer amplifier. The emitter electrode of transistor 47 is connected to ground by resistor 48 bypassed by capacitor 49. The collector electrode is connected to the primary winding of transformer 50, which transformer has a secondary winding 51 connected to the horizontal sweep system, and a secondary winding 52 connected to the target voltage supply 53. The target voltage supply may be as described in our copending application Serial No. 238,658, filed November 19, 1962.

Secondary winding 51 is connected to transistor 55 which forms the output stage of the horizontal sweep system. The collector electrode of transistor 55 is connected to a tap on the primary winding 57 of sweep output transformer 56. The damper diode 59 is connected across the emitter and collector electrodes of transistor 55. A different tap on the secondary winding 57 is connected to the horizontal output circuit 20 which supplies the horizontal deflection coils 12. One end of the primary winding 57 is connected through resistor 61 to capacitor 62, across which a direct current potential is applied by resistor 63 connected to the negative supply voltage. Resistor 63 may be variable to control the width of the horizontal deflection. The other end of the primary winding 57 is connected through resistor 64 and diode 65 to capacitor 66 across which a negative bias potential is applied. A controlled part of this potential is derived by resistors 67 and 68, filtered by resistor 69 and capacitor 70, and applied through resistor 71 to the first grid of the tube 10 to provide a negative bias therefor.

The secondary winding 60 of transformer 56 is coupled through resistor 72 to rectifiers 73, 74 and 75 which provide a high positive voltage across capacitor 76. This voltage is applied through resistor 77 to the regulating circuit including resistor 78 and Zener diodes 79 and 80. A thermistor 81 may be connected across resistor 78 to compensate for the temperature coefficient of the Zener diodes. The high voltage at point 84 is applied through the filter including resistor 82 and capacitor 83 to the accelerating electrode of the tube 10. The regulating circuit including the Zener diodes may be omitted in applications in which the increased performance is not justified by the cost of these components.

In order to provide focus potential for the tube 10, the high voltage potential at point 84 is applied through the voltage divider including resistors 86 and 87. Resistor 87 is variable to provide a controlled focus potential which is applied through the filter including capacitors 88 and 89 and resistor 90 to the focus electrodes of the tube 10.

The target voltage for the tube 10 may be provided by the target voltage supply 53 which is triggered by winding 52 of transformer 50 as previously stated. The target voltage supply can alternately be triggered by a winding on the transformer 56 of the horizontal sweep output stage.

It will be apparent that if the horizontal sweep circuit fails for any reason, the high voltage will be removed from the accelerating and focus electrodes for the pickup tube. This will effectively cut off the beam of the tube. The target voltage will also be removed to further protect the tube in the event that the horizontal oscillator fails, or when triggered from the output transformer of the horizontal sweep system, the target voltage will be removed by any failure of the horizontal sweep system. Further, failure of the vertical sweep system will remove the bias from diode 33 so that this diode will ground the base electrode of transistor 21 to prevent oscillations, so that failure of the vertical sweep system will also disable the high voltage circuit. The circuit for providing high voltage, therefore, is effective to protect the target or screen of the tube when either the horizontal or vertical sweep systems fail.

The system of the invention provides effective protection of the cathode ray tube, but does not require circuits to sense failure of the horizontal or vertical sweep systems, or separate disabling circuits for removing the high voltage. The protective circuit requires only the addition of resistors, capacitors and diodes to the circuits otherwise required, and therefore may be provided as a simple and inexpensive circuit. The circuit, however, is highly effective to prevent the application of high voltage to the cathode ray tube upon failure of the operation of the horizontal sweep system or of the vertical sweep system.

We claim:

1. A system for operating a cathode ray tube which produces an electron beam including in combination, a first circuit for deflecting the electron beam in a first direction and providing a first signal, a second circuit for deflecting the electron beam in a second direction and providing a second signal, a circuit coupled to said first circuit for providing high voltage for the tube and operative in response to said first signal, a disabling circuit coupled to said first circuit for preventing operation thereof, said disabling circuit including rectifier means for disabling said first circuit, and a bias circuit connected to said second circuit and to said rectifier means, said bias circuit producing a voltag in response to said second signal and applying said voltage to said rectifier means to render said disabling circuit inoperative.

2. A system for operating a cathode ray tube which produces an electron beam including in combination, a first deflection circuit including an oscillator for deflecting the electron beam in a first direction, a second deflection circuit for deflecting the electron beam in a second direction, a circuit coupled to said first circuit for providing high voltage for the tube and operative in response to operation of said first deflection circuit, a disabling circuit coupled to said oscillator including a diode for grounding a portion of said oscillator to prevent oscillations therein, and thereby disable said first circuit, and a bias circuit coupled to said disabling circuit and to said second circuit, said bias circuit applying a potential to said diode in response to operation of said second circuit to render the same non-conductive to remove the ground from said oscillator and permit oscillations therein.

3. A system for operating a cathode ray tube which produces an electron beam including in combination, a first deflection circuit for deflecting the electron beam in a first direction and including an oscillator, a second deflection circuit for deflecting the electron beam in a second direction, a high voltage circuit coupled to said first circuit for providing operating voltage for the tube, a disabling circuit coupled to said oscillator for preventing feedback in said oscillator to thereby disable said first deflection circuit, and a circuit connected to said disabling circuit and to said second circuit for rendering said disabling circuit inoperative in response to operation of said second circuit whereby oscillations are produced to actuate said first deflection circuit and said high voltage circuit.

4. A system for operating a cathode ray tube which produces an electron beam including in combination, a first deflection circuit for deflecting the electron beam in a first direction, said circuit including an oscillator having a transistor with an input electrode to which feedback signals are applied so that oscillations are produced, a second deflection circuit for deflecting the electron beam in a second direction, a high voltage circuit coupled to said first deflection circuit for providing operating voltage for the tube, said high voltage circuit deriving energy from said first deflection circuit, a disabling circuit including a diode coupled to said input electrode of said transistor for preventing feedback thereto to thereby prevent operation of said oscillator, a rectifier circuit coupled to said second deflection circuit for producing a bias voltage from the signal developed by said second circuit, and means applying said bias voltage to said diode to render the same non-conductive to thereby open said disabling circuit, whereby feedback signals are applied to said input electrode of said transistor and said first deflection circuit is rendered operative to energize said high voltage circuit.

5. A television camera system including a cathode ray tube which produces an electron beam, said system including in combination, a horizontal deflection circuit for deflecting the electron beam including an oscillator having a transistor with an input electrode to which feedback signals are applied so that oscillations are produced, a vertical deflection circuit for deflecting the electron beam, a high voltage circuit coupled to said horizontal deflection circuit for providing operating voltage for the tube, said high voltage circuit deriving energy from said horizontal deflection circuit, a disabling circuit including a diode coupled to said input electrode of said transistor for preventing feed back thereto to thereby prevent operation of said oscillator, a rectifier circuit coupled to said vertical deflection circuit for producing a bias voltage from the vertical deflection signal developed therein and means applying said bias voltage to said diode to render the same non-conductive to thereby open said disabling circuit, whereby oscillations are produced to actuate said horizontal deflection circuit and thereby energize said high voltage circuit.

6. A television camera system including a cathode ray tube which produces an electron beam, said system including in combination, a horizontal deflection circuit for deflecting the electron beam, and including an oscillator having a transistor with an input electrode to which feedback signals are applied so that oscillations are produced, a vertical deflection circuit for deflecting the electron beam, a high voltage circuit coupled to said horizontal deflection circuit for providing operating voltage for the tube, said high voltage circuit deriving energy from said horizontal deflection circuit, a disabling circuit for said oscillator including a diode coupled to said input electrode of said transistor, means for applying a first bias voltage to said input electrode and to said diode for rendering said diode conductive to prevent feedback to said input electrode to thereby prevent operation of said oscillator and of said horizontal deflection system, a rectifier circuit coupled to said vertical deflection circuit for producing a second bias voltage from the signal developed by said second circuit, with said second bias voltage exceeding said first bias voltage, and means applying said second bias voltage to said diode to render the same non-conductive to open said disabling circuit, whereby feedback signals are applied to said input electrode and oscillations are produced to actuate said horizontal deflection circuit and thereby energize said high voltage circuit.

7. A system for operating a cathode ray tube which produces an electron beam including in combination, a first deflection circuit for deflecting the electron beam in a first direction, said circuit including an oscillator having a transistor with an input electrode to which feedback signals are applied so that oscillations are produced, a second deflection circuit for deflecting the electron beam in a second direction, a high voltage circuit coupled to said first deflection circuit for providing operating voltage for the tube, said high voltage circuit being energized by signals developed by said first deflection circuit, a disabling circuit including a diode and a capacitor connected in series from said input electrode of said transistor to a reference potential, means for applying a first bias voltage to said input electrode and to said diode for rendering said diode conductive to prevent feedback to said input electrode to thereby prevent operation of said oscillator, a rectifier circuit coupled to said second deflection circuit for producing a second bias voltage across said capacitor from the signal developed by said second circuit, said second bias voltage exceeding said first bias voltage and acting to render said diode non-conductive to open said disabling circuit, whereby feedback signals are applied to said input electrode and oscillations are produced to actuate said first derection circuit and thereby energize said high voltage circuit.

8. A television camera system including a cathode ray tube which produces an electron beam, said system including in combination, a first deflection circuit for deflecting the electron beam in a first direction and including an oscillator and an output stage including a transformer, a second deflection circuit for deflecting the electron beam in a second direction, a high voltage rectifier circuit coupled to said transformer for providing accelerating and focus voltages for the tube, said output stage being actuated by oscillations applied thereto from said oscillator to produce high voltage pulses in said transformer, a disabling circuit coupled to said oscillator for preventing feedback in said oscillator to thereby prevent oscillations therein, and a circuit connected to said disabling circuit and to said second circuit for rendering said disabling circuit inoperative in response to operation of said second circuit whereby oscillations are produced to provide high voltage pulses in said transformer which are rectified by said high voltage rectifier circuit to produce accelerating and focus voltages for said tube.

9. A television camera system including a cathode ray tube which produces an electron beam, said system including in combination, a first deflection circuit for deflecting the electron beam in a first direction and including an oscillator, a second deflection circuit for deflecting the electron beam in a second direction, a high voltage circuit coupled to said first circuit for providing operating voltage for the tube, a target voltage circuit coupled to said first circuit and actuated by oscillations applied thereto from said oscillator, a disabling circuit coupled to said oscillator for preventing feedback in said oscillator to thereby prevent oscillations therein, and a circuit connected to said disabling circuit and to said second circuit for rendering said disabling circuit inoperative in response to operation of said second circuit whereby oscillations are produced to render said first deflection circuit and said high voltage circuit operative, and to actuate said target voltage circuit.

10. A television camera system including a cathode ray tube which produces an electron beam, said system including in combination, a first deflection circuit for deflecting the electron beam in a first direction and including an oscillator having feedback means, a second deflection circuit for deflecting the electron beam in a second direction, a high voltage circuit coupled to said first circuit for providing operating voltage for the tube, a target voltage circuit coupled to said first circuit and actuated by oscillations applied thereto from said oscillator, a disabling circuit coupled to said feedback means and including a diode adapted to conduct for preventing feedback in said oscillator to thereby prevent oscillations therein, and a bias circuit connected to said diode of said disabling circuit and to said second circuits for applying a bias voltage to said diode in response to operation of said second circuit to render said diode non-conducting so that said disabling circuit is inoperative and oscillations are produced to render said first deflection circuit and said high voltage circuit operative, and to actuate said target voltage circuit.

References Cited by the Examiner

UNITED STATES PATENTS 2,810,080 10/57 Trousdale ----------- 315—27 X

FOREIGN PATENTS 827,482 2/60 Great Britain.

DAVID G. REDINBAUGH, *Primary Examiner.*

STEPHEN W. CAPELLI, *Examiner.*